US009843504B2

United States Patent
Han et al.

(10) Patent No.: US 9,843,504 B2
(45) Date of Patent: Dec. 12, 2017

(54) EXTENDING OPENFLOW TO SUPPORT PACKET ENCAPSULATION FOR TRANSPORT OVER SOFTWARE-DEFINED NETWORKS

(71) Applicant: Futurewei Technologies, Inc., Plano, TX (US)

(72) Inventors: Lin Han, San Jose, CA (US); Renwei Li, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 483 days.

(21) Appl. No.: 14/455,735

(22) Filed: Aug. 8, 2014

(65) Prior Publication Data
US 2015/0043589 A1 Feb. 12, 2015

Related U.S. Application Data

(60) Provisional application No. 61/864,304, filed on Aug. 9, 2013.

(51) Int. Cl.
*H04L 12/721* (2013.01)
*H04L 29/06* (2006.01)
(Continued)

(52) U.S. Cl.
CPC .......... *H04L 45/38* (2013.01); *H04L 49/3009* (2013.01); *H04L 69/22* (2013.01); *H04L 47/2483* (2013.01)

(58) Field of Classification Search
CPC ......... H04L 45/74; H04L 45/54; H04L 45/38; H04L 45/745; H04L 45/64;
(Continued)

(56) References Cited

U.S. PATENT DOCUMENTS 7,701,849 B1 * 4/2010 Ma ...................... H04L 12/4625
370/230
2012/0002546 A1 * 1/2012 Sundararaman ...... H04L 49/101
370/235
(Continued)

OTHER PUBLICATIONS

Anders Nygren, OpenFlow Switch Specification Version 1.3.2, Apr. 25, 2013.*
(Continued)

*Primary Examiner* — Charles C Jiang
*Assistant Examiner* — Oussama Roudani
(74) *Attorney, Agent, or Firm* — Conley Rose, P.C.

(57) ABSTRACT

A method for controlling a data flow in a domain of an OpenFlow protocol controlled software-defined network (SDN) comprising receiving a request from a network element for instructions to route the data flow through the OpenFlow SDN, determining a route for the data flow through the OpenFlow SDN, transmitting a unified header to the network element in the OpenFlow SDN, wherein the unified header facilitates transmission of data flows through the OpenFlow SDN that are encoded according to a plurality of network abstraction types, and transmitting instructions for forwarding the data flow along the route through the OpenFlow SDN, wherein the instructions for forwarding the data flow along the route through the OpenFlow SDN comprise one or more match fields, one or more mask values corresponding to the match fields, and one or more actions for the network element in the OpenFlow SDN to perform on the data flow.

19 Claims, 6 Drawing Sheets

(51) Int. Cl.
*H04L 12/935* (2013.01)
*H04L 12/851* (2013.01)

(58) Field of Classification Search
CPC . H04L 41/0803; H04L 69/22; H04L 47/2441;
H04L 67/327; H04L 47/2483; H04L
45/42; H04L 12/4633; H04L 45/021;
H04L 63/126; H04L 12/4666; H04L
49/25
See application file for complete search history.

(56) References Cited

U.S. PATENT DOCUMENTS

2013/0097616 A1\* 4/2013 Bickle .................... G06F 8/447
719/315
2014/0119367 A1 5/2014 Han et al.

OTHER PUBLICATIONS

"OpenFlow Switch Specificaiton," Version 1.3.0 (Wire Protocol 0x04), http://www.opennetworkding.org, Jun. 25, 2012, 106 pages.

\* cited by examiner

EXTENDING OPENFLOW TO SUPPORT PACKET ENCAPSULATION FOR TRANSPORT OVER SOFTWARE-DEFINED NETWORKS

CROSS-REFERENCE TO RELATED APPLICATIONS

The present application claims priority to U.S. Provisional Patent Application 61/864,304, filed on Aug. 9, 2013 by Li Han and Renwei Li, and entitled "Extending OpenFlow to Support Packet Encapsulation for Transport over Software-Defined Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

OpenFlow may be a technology that exploits the fact that most modern Ethernet switches and routers contain flow-tables that run at line-rate to implement firewalls, network address translation (NAT), quality of service (QoS), and to collect statistics. While each vendor's flow-table may be different, OpenFlow may exploit a common set of functions that run in many switches and routers. OpenFlow may provide an open protocol to program the flow-table in different switches and routers. The data path of an OpenFlow switch comprises a Flow Table (forwarding table), and an action associated with each flow (forwarding) entry.

SUMMARY

In one embodiment, the disclosure includes a method implemented in a network controller for controlling a data flow in a domain of an OpenFlow protocol controlled software-defined network (SDN) comprising receiving a request from a network element for instructions to route the data flow from a source to a destination through the OpenFlow SDN, determining a route for the data flow from the source to the destination through the OpenFlow SDN, transmitting a unified header to the network element in the OpenFlow SDN, wherein the unified header facilitates transmission of data flows through the OpenFlow SDN that are encoded according to a plurality of network abstraction types, and transmitting instructions for forwarding the data flow along the route through the OpenFlow SDN, wherein the instructions for forwarding the data flow along the route through the OpenFlow SDN comprise one or more match fields, one or more mask values corresponding to the one or more match fields, and one or more actions for the network element in the OpenFlow SDN to perform on the data flow.

In another embodiment, the disclosure includes a computer program product comprising computer executable instructions stored on a non-transitory computer readable medium such that when executed by a processor cause a network controller to receive a request to determine a route for a data flow through a SDN that employs an OpenFlow protocol from a source to a destination, determine the route for the data flow through the OpenFlow SDN from the source to the destination, generate a unified SDN header that comprises a plurality of information fields from characteristics of the data flow and facilitates forwarding of data flows of a plurality of data flow types through the OpenFlow SDN, generate instructions for forwarding the data flow on the determined route through the OpenFlow SDN that comprise match fields, match field masks, and actions, and transmit the unified SDN header and the instructions for forwarding the data flow on the determined route through the OpenFlow SDN to a plurality of network elements in the OpenFlow SDN.

In yet another embodiment, the disclosure includes a network element in an OpenFlow SDN comprising a receiver configured to receive a data flow for forwarding to a destination, and receive instructions from a controller for forwarding the data flow to the destination through the OpenFlow SDN that comprise a unified SDN header, one or more match fields corresponding to the unified SDN header, one or more masks corresponding to the one or more match fields and the unified SDN header, and one or more actions to be performed on the data flow in response to determinations made according to the match fields, a processor coupled to the receiver and configured to store instructions received from the controller in a forwarding table, and perform an action on the data flow based on controller instruction, and a transmitter coupled to the processor and configured to transmit a request to the controller for instructions for forwarding the data flow to the destination through the OpenFlow SDN, and transmit the data flow to a downstream network element.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

SDN is a form of network architecture in which a control plane is separated from a data plane and implemented as a software application. This architecture allows network administrators to have programmable logically centralized control of network traffic without requiring physical access to the network's hardware devices. Thus, SDN may decouple network control (learning information and forwarding decisions) from network topology (junctions, interfaces, and peering). Decoupling network control from network topology may enable better routing decisions and resource utilization based on centrally collected and managed global network topology, states, and applications or traffic flow patterns. SDN may simplify network operations since a centralized controller can pre-specify an alternate routing path and configure network equipment automatically. Further, global definitions per identity, may not have to be matched to each and every interface location. The basic approach to achieve decoupling of the network control from the network topology may be to apply globally aware and topology decoupled software control at the edges of the network. Topology-coupled bridging and routing may drive the core of the network so that scalability, interoperability, high-availability, and extensibility of Internet Protocol (IP) networks can be maintained.

Disclosed herein is an extension for an OpenFlow protocol that may enable support for packets encapsulated for transport in a SDN, such as a packet encapsulated or encoded according to the New SDN Header described in U.S. Patent Application Publication 2014/0119367, which is incorporated herein by reference as if reproduced in its entirety. The disclosed extension may facilitate the use of a single header to transport data flows encoded according to a plurality of network routing schemes through a SDN that employs an OpenFlow protocol. To support the header, the OpenFlow protocol may be extended to include a plurality of match fields that correspond to the header, a plurality of masks that correspond to the match fields and the header, and a plurality of actions that may be performed according to determinations made by comparing the match fields to the header.

Figure 1:
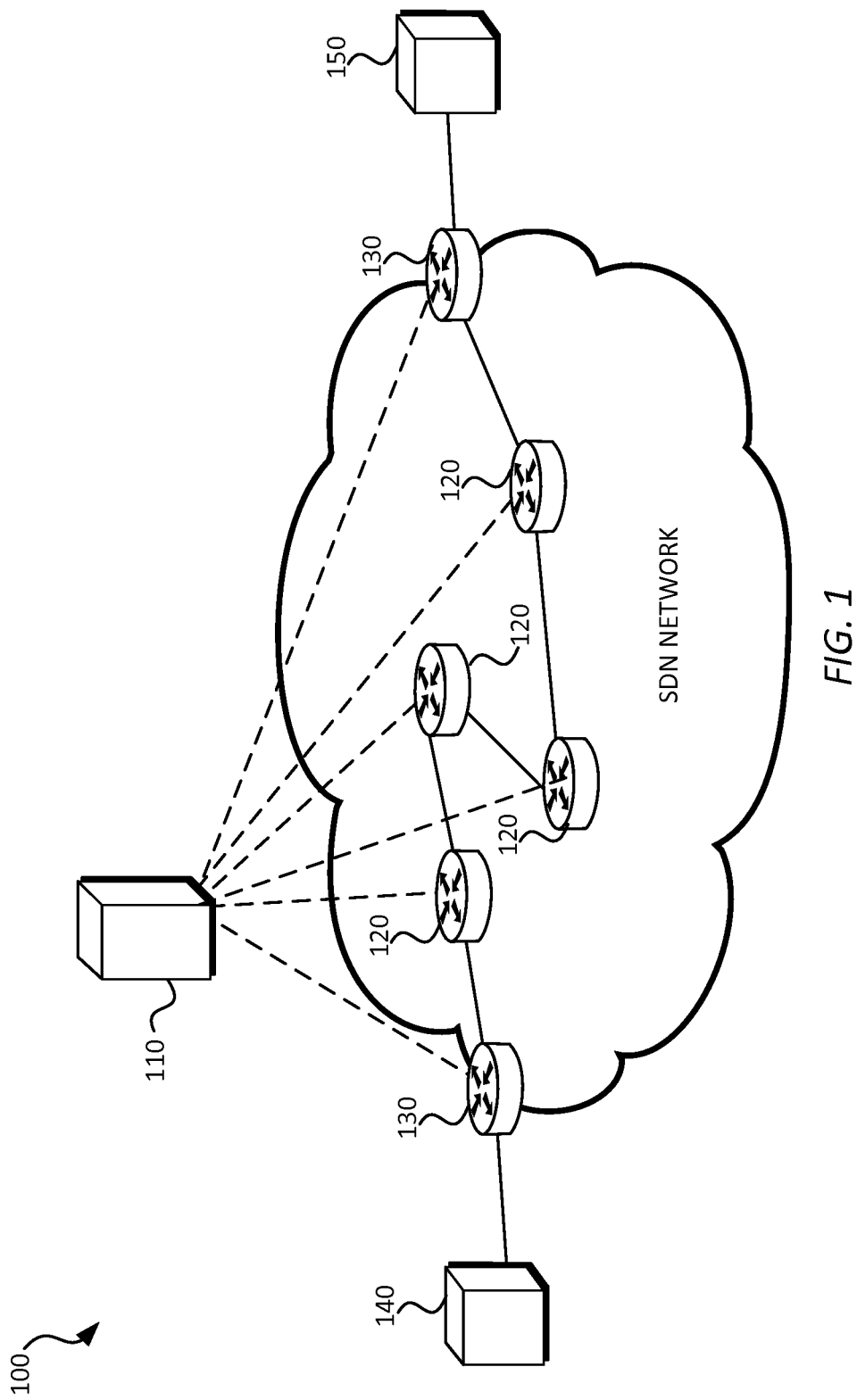
FIG. 1 is a schematic diagram of an embodiment of a SDN.

FIG. 1 is a schematic diagram of an embodiment of a SDN 100, which may include various features of the present disclosure. In SDN 100, a controller 110 may have knowledge of the topology of the SDN 100 such that the controller 110 is able to calculate a path (e.g., a best path according to open shortest path first (OSPF), shortest path first (SPF), constrained SPF (CSPF), etc.) through the SDN 100 for a data flow from a first point or source 140 to a second point or destination 150. As used herein, a data flow may be a plurality of associated data packets being transmitted from a source to a destination and may be used interchangeably with a data stream, and/or data traffic as would be appreciated by one of ordinary skill in the art. The controller 110 may operate using an OpenFlow protocol. The controller 110 may be connected to one or more transit routers 120 and/or border routers 130. The transit routers 120 may be routers inside the SDN 100 that are not on a border (e.g., an edge) of the SDN 100. For example, the transit routers 120 do not communicate directly with devices and/or network elements outside of the SDN 100. The border routers 130 may be routers on an edge of the SDN 100 which receive traffic from, or deliver traffic, to devices and/or network elements outside of the SDN 100, such as source 140 and/or destination 150. A border router 130 that receives a data flow from outside of the SDN 100 may be referred to as an ingress border router, and a border router 130 that sends a data flow outside of the SDN 100 may be referred to as an egress border router.

Controller 110 may control the routing functionality of SDN 100 by propagating a plurality of rules and/or policies to transit routers 120 and border routers 130. The rules and/or policies may be stored in a forwarding table (which may be referred to as a flow table) and may indicate how transit routers 120 and/or border routers 130 should forward the data flow through the network. The rules/policies may also indicate other actions to perform on the data flow, such that a transit router 120 and/or border router 130 that receives the data flow may determine a next router to which the data flow should be forwarded and/or an action to perform on the data flow. Controller 110 may propagate the rules and/or policies in response to receiving a request from a transit router 120 and/or border router 130. Controller 110 may also propagate the rules and/or policies in response to an ingress node (e.g., a border node 130) receiving a data flow from a source 140.

An ingress border router (e.g., a border router 130) may receive a data flow from a source 140. In response to receiving the data flow, the ingress border router may request a route through SDN 100 from controller 110. As discussed above, the ingress border router may receive rules and/or policies from controller 110 and store them in a forwarding table. The ingress node may encapsulate a SDN header (e.g., a header 300 and/or a header 400 as discussed below) on each packet of the data flow to facilitate the transportation of a plurality of types of network traffic through the SDN network using a single network protocol. For example, SDN 100 may be capable of transporting a plurality of data flow types and/or network routing schemes, for example, multiprotocol label switching (MPLS), Internet Protocol (IP), and/or media access control (MAC), etc. from source 140 to destination 150 by encapsulating the data flow with the SDN header. Accordingly, the SDN header may be referred to as a unified header because it may be a single header type that enables data flows of a plurality of network routing schemes to be forwarded through SDN 100. Encapsulating the data flow packets with the SDN header may be known as pushing the SDN header and/or performing a push action, which is discussed below in greater detail. After the data flow is encapsulated with the SDN header, the ingress border router 130 may transmit the data flow to a transit router 120 according to instructions in the forwarding table.

Transit router 120 may receive the data flow from the ingress border router 130 in SDN 100. The transit router 120 may determine a next hop for forwarding the data flow in SDN 100 and/or an action to be performed on the data flow according to information in the SDN header and/or the forwarding table based on data received from the controller 110, as discussed above. For example, the transit router 120 may compare all, or less than all, of the SDN header to predetermined values stored in the forwarding table to determine an action to be performed on the data flow. Specifically, for example, transit router 120 may determine that a new SDN header should be pushed onto the data flow, the current SDN header on the data flow should be popped off of the data flow (discussed below in greater detail), and/or the data flow should be forwarded according to information in the transit router 120's forwarding table without altering the SDN header. A data path for the data flow in SDN 100 may include any number of transit routers 120, and is not limited a number shown in the exemplary schematic diagram of FIG. 1.

An egress border router 130 may receive a data flow from a transit router 120 in SDN 100. The egress border router 130 may pop the SDN header from the data flow according to instructions stored in a forwarding table in the egress border router 130, as is discussed below in greater detail. After popping the SDN header off of the data flow, the egress border router may forward the data flow to a destination 150 according to data contained in the data flow and/or instructions stored in the egress border router's forwarding table.

Figure 2:
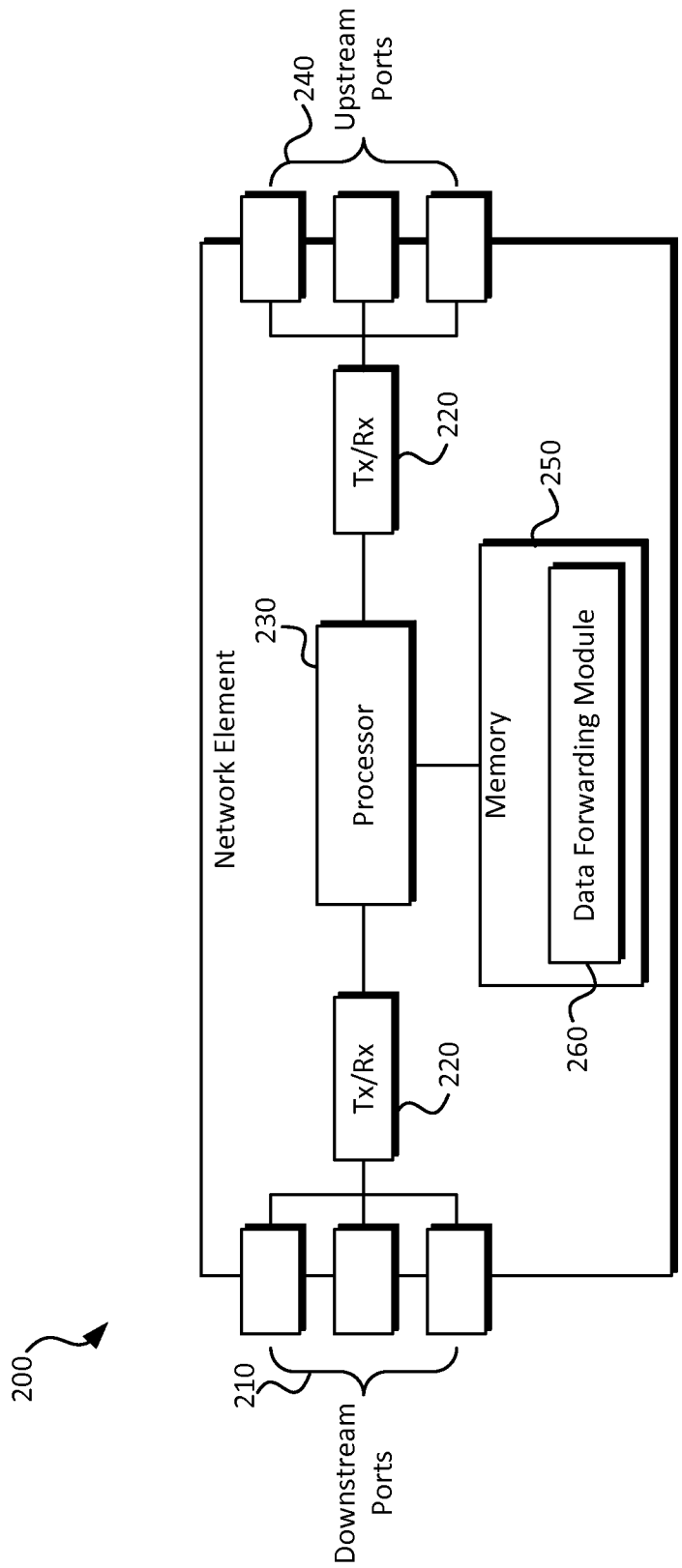
FIG. 2 is a schematic diagram of an embodiment of a network element.

At least some of the features/methods described in this disclosure may be implemented in a network element. For instance, the features/methods of this disclosure may be implemented using hardware, firmware, and/or software installed to run on hardware. FIG. 2 is a schematic diagram of an embodiment of a network element 200 that may be used to transport and process traffic through at least a portion of a network, such as SDN 100, shown in FIG. 1. The network element 200 may be any device (e.g., an access point, an access point station, a router, a switch, a gateway, a bridge, a server, a client, a user-equipment, a mobile communications device, etc.) which transports data through a network, system, and/or domain. Moreover, the terms network element, network node, network component, network module, network controller, and/or similar terms may be interchangeably used to generally describe a network device and do not have a particular or special meaning unless otherwise specifically stated and/or claimed within the disclosure. For example, network element 200 may be or incorporated within controller 110, transit routers 120, and/or border routers 130, shown in FIG. 1.

The network element 200 may comprise one or more downstream ports 210 coupled to a transceiver (Tx/Rx) 220, which may comprise transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components. In another embodiment, the network element 200 may comprise one or more antennas coupled to the Tx/Rx 220. The Tx/Rx 220 may transmit and/or receive data (e.g., packets) from other network elements via wired or wireless connections, depending on the embodiment.

A processor 230 may be coupled to the Tx/Rx 220 and may be configured to process the frames and/or determine to which nodes to send (e.g., transmit) the packets. In an embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to communicate and/or process multi-destination frames.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs which are loaded into the RAM when such programs are selected for execution. The ROM is used to store instructions and perhaps data that are read during program execution. The ROM is a non-volatile memory device which typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various embodiments described herein. In one embodiment, the memory module 250 may comprise a data forwarding module 260 which may be implemented via execution by the processor 230. In an alternate embodiment, the processor 230 may comprise the data forwarding module 260. In one embodiment, the data forwarding module 260 may be implemented to facilitate content forwarding and processing functions in a SDN network (e.g., SDN 100, shown in FIG. 1) the forwarding and processing may be done according to information stored in a forwarding table and/or according to information received from another network element (e.g., a network controller). In some embodiments the data forwarding module may determine a route and/or header for a data flow through the SDN network for transmitting to a plurality of other network elements. The data forwarding module 260 may forward the data flow, route, and/or header to a downstream network element via downstream ports 240. The data forwarding module 260 may be implemented using software, hardware, or both and may operate above the IP layer, e.g., linking layer 2 (L2) or linking layer 3 (L3), in the Open Systems Interconnect (OSI) model.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM, flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 3:
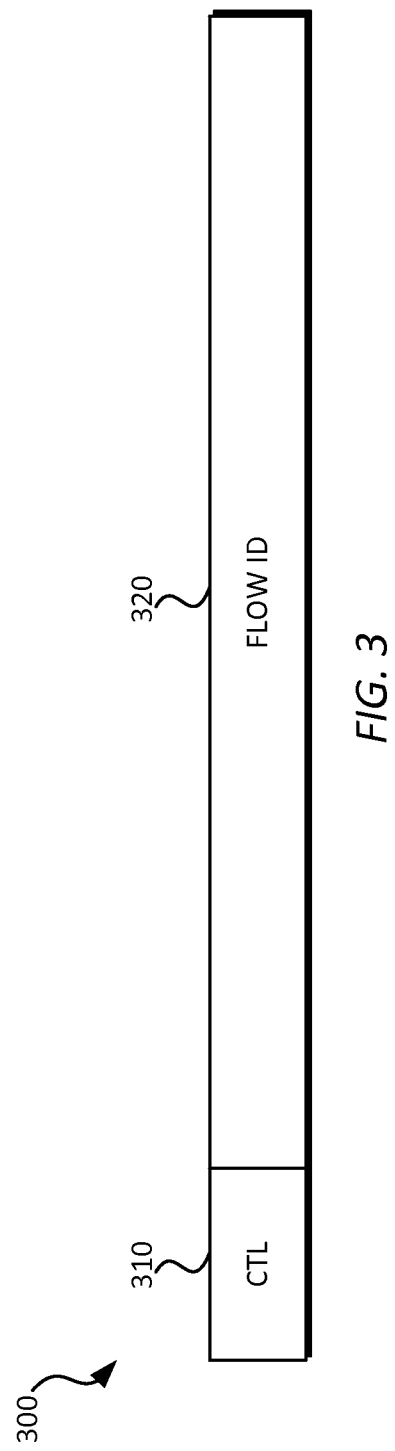
FIG. 3 is a schematic diagram of an embodiment of a New SDN Header.

FIG. 3 is schematic diagram of an embodiment of a New SDN Header 300 that may be supported by an embodiment of the present disclosure. To facilitate the transmission of a data flow from a source to a destination through a SDN (e.g., SDN 100, shown in FIG. 1), in some embodiments, header 300 may be pushed onto a data packet in a data flow by a router (e.g. transit routers 120 and/or border routers 130, shown in FIG. 1) according to instructions received from a controller (e.g., controller 110, shown in FIG. 1). In some embodiments, header 300 may be popped off of a data packet in the data flow by a router according to instructions received from the controller. Header 300 may be assigned according to an implicit method and may comprise a control (CTL) field 310 and a flow identification (ID) field 320. The control field 310 may indicate a version of header 300. Accordingly, header 300 may have a plurality of versions, for example, four versions, each having different characteristics. A size of header 300 may be determined according to the version of header 300 indicated in control field 310. For example, a version 0 header 300 may be about four octets in length, a version 1 header 300 about six octets in length, a version 2 header 300 about twelve octets in length, and a version 3 header about sixteen octets in length. The flow ID field 320 may be used to identify and distinguish data flows in a network and may be assigned by the controller in the network, (e.g., controller 110, shown in FIG. 1) and may represent predefined properties of the data flow passing through the network. Header 300 may be implicitly assigned to a data flow. For example, header 300 may be assigned to a data flow automatically from a pool of available flow IDs according to predefined policies and/or the type of service, process, and/or data contained in the data flow. For example, a data flow containing traffic in a virtual private network (VPN) may receive a flow ID from a pool of available flow IDs for VPN traffic and a data flow containing a different type of traffic may receive a flow ID from a different pool of available flow IDs. As discussed above, header 300 may be encapsulated on a plurality of types of network traffic, and may therefore be referred to as a unified header.

Figure 4:
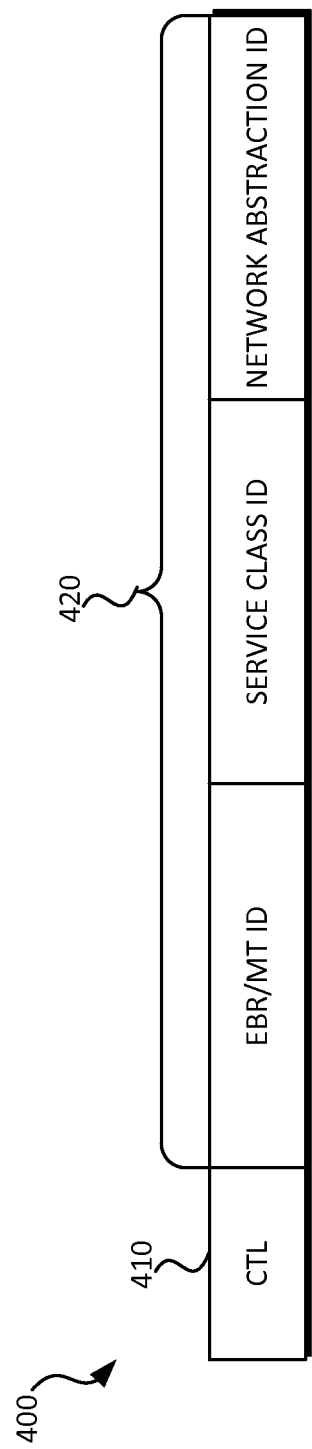
FIG. 4 is another schematic diagram of an embodiment of a New SDN Header.

FIG. 4 is another schematic diagram of an embodiment of a New SDN Header 400 that may be supported by an embodiment of the present disclosure. To facilitate the transmission of a data flow from a source to a destination through a SDN (e.g., SDN 100, shown in FIG. 1), in some embodiments, header 400 may be pushed onto a data packet in a data flow by a router (e.g. transit routers 120 and/or border routers 130, shown in FIG. 1) according to instructions received from a controller (e.g., controller 110, shown in FIG. 1). In some embodiments, header 400 may be popped off of a data packet in the data flow by a router according to instructions received from the controller. Header 400 may be assigned according to an explicit method and may comprise a control (CTL) field 410 and a flow ID field 420. The control field 410 may indicate a version of header 400, whether header 400 is associated with a multicast or a unicast data flow, and whether the data flow is a backup data flow for data protection. Header 400 may be associated with a plurality of versions, for example, four versions as discussed above in reference to header 300. The flow ID field 420 may comprise a plurality of fields. For example, the flow ID field 420 may comprise an edge border router (EBR)/multicast tree (MT) ID field that may indicate a destination border router ID or a multicast tree ID for the data flow. Flow ID field 420 may further comprise a service class ID field that may indicate source information, application information, class of service, type of service, bandwidth, latency, etc. for the data flow. Flow ID field 420 may also comprise a network abstraction field that may indicate a network abstraction layer of the data flow such as IP version 4 (IPv4), IPV4 VPN, IP version 6 (IPv6), IPv6 VPN, Virtual Private Local Area Network Service (VPLS), L2 VPN, MT, MPLS, MAC, etc. As with flow ID field 320, shown in FIG. 3, flow ID field 420 may be used to identify and distinguish data flows in a network and may be assigned by a controller in the network, (e.g., controller 110, shown in FIG. 1) based on characteristics of the data flow with which flow ID field 420 is associated. Header 400 may be explicitly assigned to a data flow. For example, the controller may explicitly assign data in each field of header 400 and/or in each field of flow ID 420. As discussed above, header 400 may be encapsulated on a plurality of types of network traffic, and may therefore be referred to as a unified header.

To support header 300 and/or header 400, shown in FIG. 3 and FIG. 4 respectively, in a SDN such as SDN 100, shown in FIG. 1, an extension to the OpenFlow protocol may be required. To enable routers (e.g., transit routers 120 and/or border routers 130, each shown in FIG. 1) to have knowledge of actions that should be performed on a data flow being transmitted through the SDN, the OpenFlow extension may create additional rules for handling a data flow. Such rules (e.g., match fields, masks, and/or actions) may be received from an OpenFlow controller and stored in a SDN router flow tale. As discussed above, in OpenFlow, these rules may be determined according to match fields. To support header 300 and/or header 400, match fields may be defined in an OpenFlow extension such that a router with the OpenFlow extension installed on it may be capable of comparing a header associated with a data flow to the match fields to determine if the header is a header 300, a header 400, or a different kind of header. For example, Table 1 defines match fields in an OpenFlow match field tuple definition that may be defined to provide matches for a header having four versions as disclosed above.

TABLE 1

```
enum oxm_ofb_match_fields {
    OFPXMT_OFB_IN_PORT=0, /* Switch Input port */
    ...
    OFPXMT_OFB_IPV6_EXTHDR=39, /* IPv6 Extension Header
    pseudo-field */
    OFPXMT_OFB_SDN_VER0=40, /* New SDN header Version 0 */
    OFPXMT_OFB_SDN_VER1=41, /* New SDN header Version 1 */
    OFPXMT_OFB_SDN_VER2=42, /* New SDN header Version 2 */
    OFPXMT_OFB_SDN_VER3=43, /* New SDN header Version 3 */
};
```

It should be noted that the constant values 40, 41, 42, and 43 may be values assigned at the time the extension is implemented in OpenFlow, and accordingly, may be incremented to an available block of constant values to accommodate the definition of other match fields.

To support header 300 and/or header 400, each router in the SDN may be required to support the match field, shown in Table 1, for each version of header 300 and/or header 400. Each match field may have a plurality of characteristics associated with it, for example, a size, prerequisites, masking capability, description, etc. For example, the match fields may have characteristics as shown below in Table 2, in which ETH_TYPE indicates an Ethernet type.

TABLE 2

| Match Field | Size (bits) | Mask | Prerequisite | Description |
| --- | --- | --- | --- | --- |
| OFPXMT_OFB_SDN_VER0 | 32 | Yes | ETH_TYPE | New SDN Header version 0, can use mask when flow ID is explicitly assigned |
| OFPXMT_OFB_SDN_VER1 | 48 | Yes | ETH_TYPE | New SDN Header version 1, can use mask when flow ID is explicitly assigned |
| OFPXMT_OFB_SDN_VER2 | 96 | Yes | ETH_TYPE | New SDN Header version 2, can use mask when flow ID is explicitly assigned |
| OFPXMT_OFB_SDN_VER3 | 128 | Yes | ETH_TYPE | New SDN Header version 3, can use mask when flow ID is explicitly assigned |

As shown in Table 2, a header may have an associated mask. The masks may allow routers (e.g., transit routers 120 and/or border routers 130, each shown in FIG. 1) to selectively match part, but not all, of a particular match field in the flow ID field. For example, a router may determine an action to be performed on the data flow associated with a header based on the destination router ID of the data flow that is indicated in the header without regard for the remainder of the information in the header. In this case, a mask may be applied to the header to indicate the destination router ID is the only data in the header that is considered by the router applying the mask.

Each router may receive information from the controller (e.g., controller 110, shown in FIG. 1) that indicates whether a header has a mask associated with it. For example, each router may receive an oxm_hasmask value from the controller. For a header 300, shown in FIG. 3, which is assigned according to an implicit method, the flow ID field may be chosen from a pool of available flow IDs and may be a logical value. Therefore, for a header 300, oxm_hasmask may be false or "0" at all times. For a header 400, shown in FIG. 4, that is assigned according to an explicit method (e.g., when the flow ID field comprises particular information about the associated data flow), the header 400 may have a mask associated with it and the oxm_hasmask value received from the controller may be set to true or "1." For a header 400 that does not have a mask associated with it, the oxm_hasmask value received from the controller may be set to false or "0."

When oxm_hasmask is set to true, an oxm_mask value may follow the match field, shown in Table 1, to which the mask should be applied. For example, a mask that should be associated with version 2 headers may be indicated in an oxm_mask field that follows the OFPXMT_OFB_SDN_VER2=42 value shown in Table 1. The mask may be the same length as the header 400 (e.g., four, six, twelve, or sixteen octets) with which the mask is associated. In a mask associated with a header 400, a true or 1 bit may mean that the router requires the corresponding match field in header 400 to match exactly, and a false or 0 bit may mean that the router does not consider what value is in the corresponding match field in header 400. Masking a header 400 and matching part but not all of the match fields to determine how to forward a data flow through a network may increase performance in the network by requiring less time.

According to administrative policies in a network, such as SDN 100, shown in FIG. 1, and/or decisions made by routers (e.g., transit routers 120 and/or border routers 130, each shown in FIG. 1) according to rules received from a controller, such as controller 110, shown in FIG. 1, a router may perform an action on a header (e.g., header 300 and/or header 400, shown in FIGS. 3 and 4 respectively). The action may be, for example, popping the header 300 and/or header 400 off of the data flow with which it is associated, pushing a new header 300 and/or header 400 onto a data flow, and/or passing the data flow through the router with no change. The actions may be defined in an OpenFlow ofp_action_type data structure that allows routers on which the data structure is installed to forward data flows having headers 300 and/or headers 400 according to actions. For example, Table 3 defines actions that may push and/or pop a header 300 and/or header 400 from a data flow in a SDN.

TABLE 3

```
enum ofp_action_type {
    OFPAT_POP_PBB = 27, /* Pop the outer PBB service tag (I-TAG)
    */
    OFPAT_PUSH_SDN_HD = 28,
    OFPAT_POP_SDN_HD = 29,
    OFPAT_EXPERIMENTER = 0xffff
};
```

It should be noted that the constant values 28 and 29 may be values assigned at the time the extension is implemented in OpenFlow, and accordingly, may be incremented to an available block of constant values to accommodate the definition of other actions.

Figure 5:
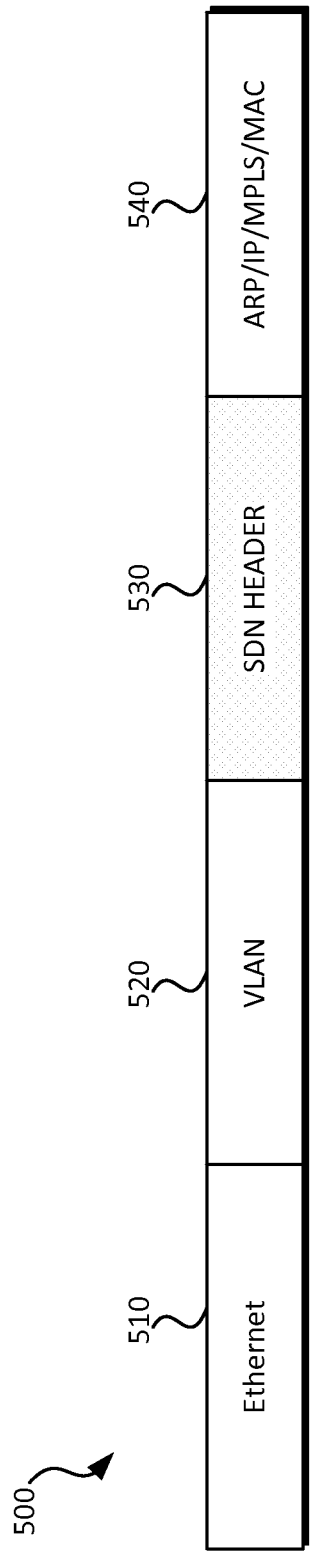
FIG. 5 is a schematic diagram of an embodiment of a header order on a data packet in a data flow.

FIG. 5 is a schematic diagram 500 of an embodiment of a header order on a data packet of a data flow. The header order may comprise an Ethernet/MAC tag 510, a virtual local area network (VLAN) tag 520, a SDN header 530, and a tag indicating a network routing scheme (e.g., address resolution protocol (ARP), IP, MPLS, MAC, etc.) for the data packet and data flow. A router (e.g., transit routers 120 and/or border routers 130, shown in FIG. 1) may push (e.g., add) a new header 300 and/or header 400, shown in FIGS. 3 and 4 respectively, onto a data flow when the router receives an OFPAT_PUSH_SDN_HD instruction. The instruction may be received from a controller (e.g., controller 110, shown in FIG. 1) at the time it should be executed, or the instruction may be received from the controller previously and stored in a table (e.g., a flow table) on the router. The router may execute the OFP_PUSH_SDN_HD by inserting a new header 300 and/or header 400 as the SDN header 530 after VLAN tag 520 or a Ethernet/MAC tag 510 in the header order of the data flow, as shown in diagram 500. Inserting the SDN header 530 between tags in the header order may sometimes be referred to as inserting a shim header. In some embodiments of a header order for a data flow, it may be necessary for a header 300 and/or header 400 in a network such as SDN 100, shown in FIG. 1, to occupy a position in the header order that immediately follows the Ethernet/MAC tag 510 and the VLAN tag 520 in the header order. Ensuring this position for the header 300 and/or header 400 may facilitate the encoding of a plurality of types of data flows with header 300 and/or header 400 in a SDN.

When a new header 300 and/or header 400 is pushed into the header order in a data flow, the new header 300 and/or header 400 may replace a preexisting header. A length of space required in the header order for the new header 300 and/or header 400 may be determined according to control bits in the header 300 and/or header 400. When a router pushes a new header 300 and/or header 400 onto a data flow, an Ethernet type for the data flow and a frame check sequence (FCS) for the Ethernet frame containing the data flow may be updated.

A router may also pop (e.g., remove) a header 300 and/or header 400 from a data flow when the router receives an OFPAT_POP_SDN_HD instruction. The instruction may be received from a controller (e.g., controller 110, shown in FIG. 1) at the time it should be executed, or the instruction may be received from the controller previously and stored in a table (e.g., a flow table) on the router. The router may execute the OFP_POP_SDN_HD by removing the header 300 and/or header 400 from a header order of the data flow, shown in FIG. 5. The router may determine the size of the header 300 and/or header 400 that is to be popped according to control bits in the header 300 and/or header 400. When a router pops a header 300 and/or header 400 from a data flow, an Ethernet type for the data flow and a frame check sequence (FCS) for the Ethernet frame containing the data flow may be updated.

Figure 6:
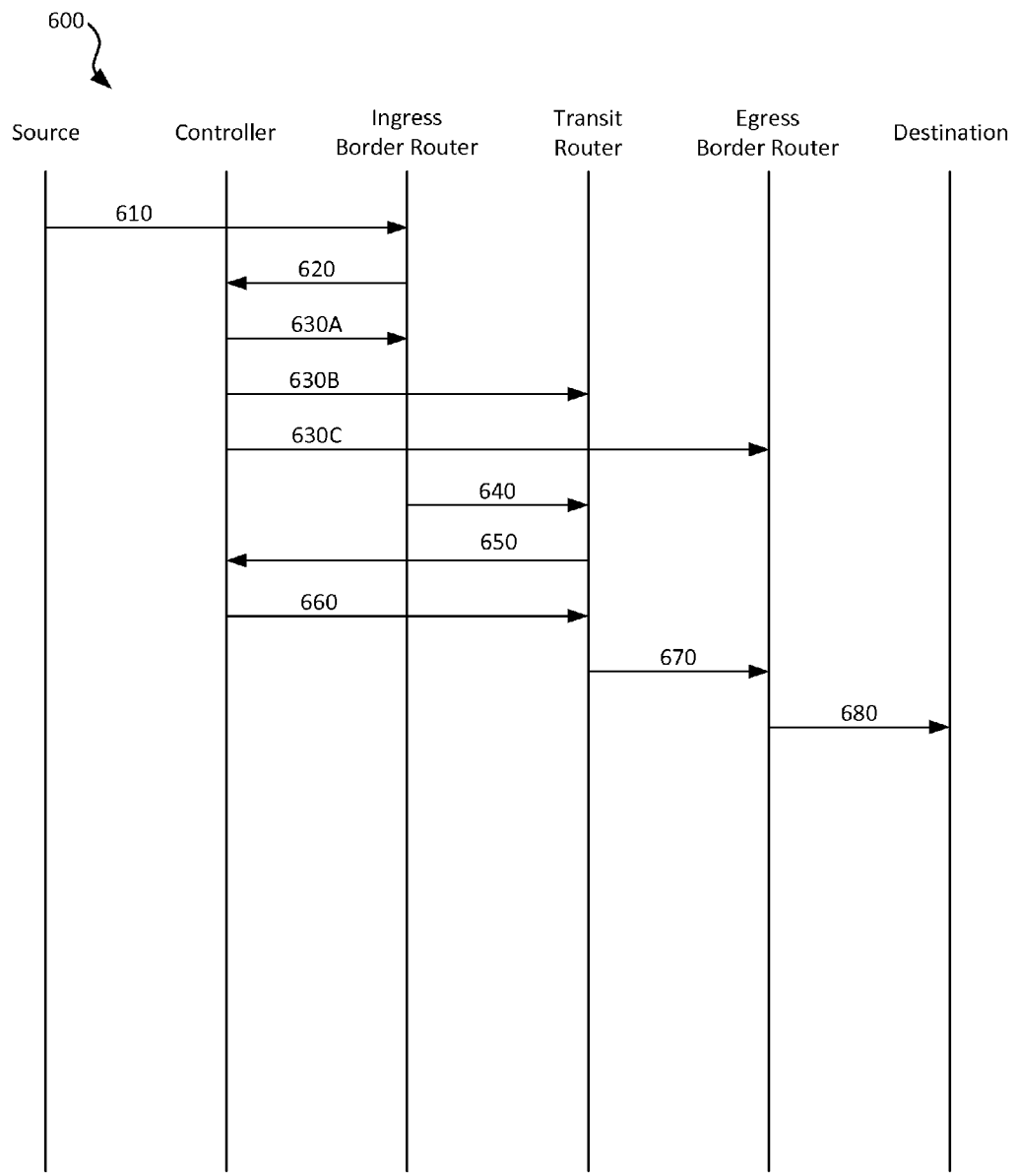
FIG. 6 is a protocol diagram of an embodiment of a method for supporting a unified header in a SDN.

FIG. 6 is a protocol diagram of an embodiment of a method 600 for supporting a unified header (e.g., a header 300 and/or a header 400, shown in FIG. 3 and FIG. 4 respectively) in a SDN, such as SDN 100, shown in FIG. 1. In FIG. 6, the source, controller, ingress border router, transit router, egress border router, and destination may be substantially similar to source 140, controller 110, ingress border router (border router 130), transit router 120, egress border router (border router 130), and destination 150, shown in FIG. 1. At step 610, a source may transmit a data flow to an ingress border router in a SDN that is to be delivered to a destination. At step 620, the ingress border router may send a request to a controller for information for forwarding the data flow to the destination. The information may include a SDN header (e.g., a unified header), routing instructions, flow routes, etc.

At step 630A, the controller may send a SDN header to the ingress border router to be encapsulated on the data flow, as well as, optionally, other instructions for forwarding the data flow to the destination through the SDN that may be stored in a forwarding table on the ingress border router. At step 630B, the controller may transmit instructions for forwarding the data flow to the destination through the SDN to the transit router where the instructions may be stored in a forwarding table. At step 630C, the controller may transmit instructions for forwarding the data flow to the destination through the SDN to the egress border router where the instructions may be stored in a forwarding table. It should be noted that steps 630A-C may be implemented in an sequential order and/or simultaneously via a broadcast and/or multicast control message. At step 640, the ingress border router may encapsulate the SDN header onto the data flow and transmit the data flow to the transit router according to instructions contained in the ingress border router's forwarding table.

Optionally, at step 650, a transit router that has received a data flow and does not have instructions for forwarding the data flow may request instructions from the controller. If the transit router has requested instructions from the controller at step 650, at step 660, the controller may transmit instructions for forwarding the data flow to the destination through the SDN to the transit router where the instructions may be stored in a forwarding table.

At step 670, the transit router may compare the SDN header in the data flow to a defined set of values stored on the router (e.g., match fields) to determine how the data flow should be forwarded. In some embodiments, the transit router may compare all fields in the SDN header to defined values to make a determination, and in some embodiments the transit router may apply a mask to the SDN header so that less than all fields in the SDN header are compared to defined values to make a determination. According to the determination made by comparing the SDN header to defined values, the transit router may perform an action on the SDN header such as, for example, pushing a new SDN header onto the data flow and replacing a preexisting SDN header on the dataflow, popping the SDN header off of the data flow, and/or forwarding the data flow without altering the SDN header. After comparing the SDN header to defined values and determining how the data flow should be forwarded, the transit router may perform one or more actions on the data flow according to instruction received from the controller and/or instructions stored on the transit router, for example, in a forwarding table, before transmitting the data flow to the egress border router.

At step 680, the egress border router may compare fields in the SDN header of the data flow to defined values in a manner substantially similar to that of the transit router. After comparing the SDN header to defined values and determining what action to perform on the data flow according to instruction received from the controller and/or instructions stored on the egress border router, the egress border router may pop the SDN header from the data flow and forward the data flow to the destination.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a network controller for controlling a data flow in a domain of an OpenFlow software-defined network (SDN) comprising:
   receiving a request from a network element for instructions to route the data flow from a source to a destination through the OpenFlow SDN;
   determining a route for the data flow from the source to the destination through the OpenFlow SDN;
   transmitting a unified header to the network element in the OpenFlow SDN, wherein the unified header facilitates transmission of a plurality of data flows through the OpenFlow SDN that are encoded according to a plurality of network abstraction types, wherein the plurality of data flows comprise the data flow, wherein the unified header is a header for a data packet of the data flow to be routed from the source to the destination, wherein the unified header comprises an identifier of one of the network abstraction types associated with the data flow; and
   transmitting the instructions for forwarding the data flow along the route through the OpenFlow SDN, wherein the instructions comprise one or more match fields, one or more mask values corresponding to the one or more match fields, and one or more actions for the network element in the OpenFlow SDN to perform with the unified header on the data packet of the data flow, and wherein the one or more actions comprise at least one of encapsulating the unified header onto the data packet or removing the unified header from the data packet, wherein the instructions are separate from the unified header, and wherein the instructions for forwarding the data flow comprise instructions to perform matching between the unified header and the one or more match fields.

2. The method of claim 1, wherein the unified header comprises a control field and a flow identification (ID) field.

3. The method of claim 2, wherein the flow ID field is implicitly assigned by the network controller by selecting a flow ID from a pool of available flow IDs that correspond to a service type of the data flow.

4. The method of claim 2, wherein the flow ID field comprises an egress border router or multicast tree ID field, a service class ID field, and a network abstraction ID field.

5. The method of claim 4, wherein the egress border router or multicast tree ID field, the service class ID field, and the network abstraction ID field are explicitly assigned by the network controller according to properties of the data flow.

6. The method of claim 1, wherein the network element further comprises an internal network element, an ingress network element, or an egress network element.

7. The method of claim 1, wherein the plurality of network abstraction types comprises an address resolution protocol (ARP) multiprotocol label switching (MPLS), Internet Protocol (IP), and media access control (MAC).

8. The method of claim 1, wherein encapsulating the unified header onto the data packet in the OpenFlow SDN comprises inserting the unified header after an Ethernet tag and a virtual local area network (VLAN) tag in an encoding of the data packet.

9. A computer program product comprising computer executable instructions stored on a non-transitory computer readable medium such that when executed by a processor cause a network controller to:
receive a request to determine a route for a data flow through a software-defined network (SDN) that employs an OpenFlow protocol (Open Flow SDN) from a source to a destination;
determine the route for the data flow through the OpenFlow SDN from the source to the destination;
generate a unified SDN header that comprises a plurality of information fields representing characteristics of the data flow and facilitates forwarding of data flows of a plurality of data flow types through the OpenFlow SDN, wherein the unified SDN header is a header for a data packet of the data flow to be routed from the source to the destination, and
wherein the unified SDN header comprises an identifier of a network abstraction type associated with the data flow;
generate instructions for forwarding the data flow on the determined route through the OpenFlow SDN that comprise match fields, match field masks, and actions for a plurality of network elements in the OpenFlow SDN to perform with the unified SDN header on the data packet of the data flow, wherein the actions comprise at least one of encapsulating the unified header onto the data packet or removing the unified header from the data packet,
wherein the instructions are separate from the unified header, and wherein the instructions for forwarding the data flow comprise instructions to perform matching between the unified header and the match fields; and
transmit the unified SDN header and the instructions for forwarding the data flow on the determined route through the OpenFlow SDN to the plurality of network elements in the OpenFlow SDN.

10. The computer program product of claim 9, wherein the unified SDN header comprises:
a control field comprising an indicator of a version of the header, wherein the indicator indicates a size of the header; and
a flow identification (ID) field that comprises a unique ID determined based on parameters of the data flow that identifies the data flow in the OpenFlow SDN when a plurality of data flows are present in the OpenFlow SDN.

11. The computer program product of claim 9, wherein the match field comprises predefined values for determining the data packet is associated with an action when the match field matches a value in the unified SDN header.

12. The computer program product of claim 11, wherein the match field mask is identical in size to the match field to which it corresponds, and wherein the match field comprises an indication of which values in the match field must be identical to a result in a match.

13. A network element in an OpenFlow software-defined network (SDN) comprising:
a receiver configured to:
receive a data flow for forwarding to a destination; and
receive instructions from a controller for forwarding the data flow to the destination through the OpenFlow SDN that comprise:
a unified SDN header that is a header for a data packet in the data flow for forwarding to the destination, wherein the unified SDN header comprises an identifier of a network abstraction type associated with the data flow;
one or more match fields corresponding to the unified SDN header;
one or more masks corresponding to the one or more match fields and the unified SDN header; and
one or more actions to be performed with the unified SDN header on the data packet in the data flow in response to determinations made according to the match fields, wherein the one or more actions comprise at least one of encapsulating the unified header onto the data packet or removing the unified header from the data packet,
wherein the instructions are separate from the unified header, and wherein the instructions for forwarding the data flow comprise instructions to perform matching between the unified header and the one or more match fields;
a processor coupled to the receiver and configured to:
store instructions received from the controller in a forwarding table; and
perform an action on the data packet of the data flow based on the one or more actions in the instructions received from the controller; and
a transmitter coupled to the processor and configured to:
transmit a request to the controller for instructions for forwarding the data flow to the destination through the Open Flow SDN; and
transmit the data flow to a downstream network element.

14. The network element of claim 13, wherein the processor is further configured to:
determine whether a unified SDN header and corresponding match fields have an associated mask according to an oxm_hasmask parameter;
compare one or more values in the SDN header that are indicated by the mask to the one or more match fields when the unified SDN header and corresponding match fields have the associated mask;
compare all values in the unified SDN header to the one or more match fields when the unified SDN header and corresponding match fields do not have the associated mask; and
perform the action on the data flow based on controller instructions according to a comparison of the unified SDN header and the match fields and the forwarding table.

15. The network element of claim 13, wherein the downstream network element comprises the destination.

16. The network element of claim 13, wherein the data flow is received from a source outside of the OpenFlow SDN.

17. The network element of claim 13, wherein the one or more actions to be performed on the data flow is selected from a group consisting of pushing a new unified SDN header onto a packet of the data flow according to an OFPAT_PUSH_SDN_HD actions, popping a unified SDN header off of the packet of the data flow according to an OFPAT_POP_SDN_HD action, and forwarding the data flow without altering the unified SDN header.

19. The network element of claim 13, wherein the match field is selected from a group consisting of OFPXMT_OFB_SDN_VERO, OFPXMT_OFB_SDN_VER1, OFPXMT_OFB_SDN_VER2, and OFPXMT_OFB$_{13}$SDN_VER3.

19. The network element of claim 13, wherein the one or more masks corresponding to the one or more match fields and the unified SDN header comprise an oxm_mask value.

* * * * *

UNITED STATES PATENT AND TRADEMARK OFFICE
CERTIFICATE OF CORRECTION

PATENT NO. : 9,843,504 B2
APPLICATION NO. : 14/455735
DATED : December 12, 2017
INVENTOR(S) : Lin Han et al.

It is certified that error appears in the above-identified patent and that said Letters Patent is hereby corrected as shown below:

In the Claims

Column 17, Lines 3-7, Claim 18 should read:
18. The network element of claim 13, wherein the match field is selected from a group consisting of OFPXMT_OFB_SDN_VER0, OFPXMT_OFB_SDN_VER1, OFPXMT_OFB_SDN_VER2, and OFPXMT_OFB_SDN_VER3.

Signed and Sealed this
Eighth Day of May, 2018

Andrei Iancu
*Director of the United States Patent and Trademark Office*